CARL W. JOHNSON
WARREN L. MARTIN
*INVENTORS*
BY D E Leslie
G Tims & Coy
ATTORNEY April 23, 1968 JAMES E. WEBB 3,380,049
ADMINISTRATOR OF THE NATIONAL AERONAUTICS
AND SPACE ADMINISTRATION
METHOD OF RESOLVING CLOCK SYNCHRONIZATION
ERROR AND MEANS THEREFOR
Filed May 17, 1967
2 Sheets-Sheet 2

CARL W. JOHNSON
WARREN L. MARTIN
INVENTORS
BY
ATTORNEY

United States Patent Office 3,380,049

Patented Apr. 23, 1968

3,380,049

METHOD OF RESOLVING CLOCK SYNCHRONIZATION ERROR AND MEANS THEREFOR

James E. Webb, Administrator of the National Aeronautics and Space Administration, with respect to an invention of Carl W. Johnson, Covina, and Warren L. Martin, La Canada, Calif.

Filed May 17, 1967, Ser. No. 640,455
16 Claims. (Cl. 343—6.5)

ABSTRACT OF THE DISCLOSURE

The method and means for resolving the synchronization error of clocks in a plurality of stations tracking a spacecraft or satellite. It includes sources of high frequency signals, accurately counted in the stations between start pulses produced in the stations from clocks, independently synchronized to within several milliseconds, and stop pulses produced in response to a signal received from the spacecraft. The count in each station represents an accurate time interval. The difference between the measured intervals equals the time period related to the range difference between the stations and the spacecraft, a time period representing known system errors, and the clock synchronization error. Knowing the range differences and the system errors the clock synchronization error is easily computed.

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

(1) *Field of the invention*

This invention generally relates to a clock synchronization system and, more particularly, to a method and means for resolving the time synchronization error of clocks of different space satellite tracking stations.

(2) *Description of the prior art*

Nearly all past and future space missions employ a plurality of tracking stations, located at distant places over the globe. The success or failure of a space mission often depends on the ability to accurately correlate the data received at such stations, in order to perform critical spacecraft maneuvers. To determine the time at which data is received at each station, the station continuously records a time code derived from a very precise master clock. Unfortunately however, in the past it has not been possible to synchronize the clocks of the various stations to better than several milliseconds, thereby limiting the accuracy of the correlated data.

Interstation clock synchronization is presently hampered by lack of a wide band communication channel over which clock synchronization signals can be sent. Synchronization to within several milliseconds is achieved by the independent synchronization of each clock to a related source, such as WWV.

Although synchronization to such accuracy is quite significant, a capability of reducing synchronization error to only a few microseconds, would greatly enhance the accuracy of the correlated data. Thus, a need exists for an improved method of synchronizing clocks of different spacecraft or satellite tracking stations and for means to accomplish such synchronization.

OBJECTS AND SUMMARY OF THE INVENTION

It is a primary object of the present invention to provide a new improved method of synchronizing clocks of different tracking stations.

Another object of this invention is to provide a new method of synchronizing clocks of tracking stations with an increase in resolution of about 1000 times over present error resolution capabilities.

A further object of this invention is to provide a simple method of reducing the synchronization error of clocks of different tracking stations with relatively simple means.

Still another object of this invention is to provide relatively simple and highly stable means to resolve the synchronization error of clocks of a plurality of tracking stations.

These and other objects of the invention are achieved by employing the closed loop ranging techniques, heretofore used only to measure range between a spacecraft and tracking station, for clock synchronization and, more particularly, to resolve the synchronization error between clocks of different tracking stations. Briefly, in present space mission tracking systems, each tracking station is generally equipped with a ranging subsystem capable of resolving distance to a few meters. In such a subsystem, a pseudonoise code is transmitted from the station to the spacecraft or satellite where the exact code is retransmitted to the station. The ground station receiver is locked to the code, with the time elapsing between transmission and reception indicating the time required for radio signals to travel to the satellite and back to the station. Such time is used to precisely determine the distance or range between the code transmitting station and the spacecraft or satellite.

Each station is capable of receiving and locking its receiver ranging coder to the code returning from a spacecraft or satellite, terms which hereafter will be used interchangeably. In practice however, all the stations receive and lock to the same code but only one station, hereafter referred to as the primary station, makes a meaningful range measurement. The range from the spacecraft to the primary station is computed therein and therefrom the range from the spacecraft to each of the other stations is determined. In each station, a marker pulse is produced whenever a preselected sequence of bits of the code is received from the spacecraft.

In accordance with the present invention, each station generates independent timing signals generally derived from a very precise frequency standard, which together with associated equipment is often referred to as the station's clock. At each station, an elapsed-time counter is started by a specific timing pulse to count cycles from a precise high frequency source. However, since the clocks of the various stations are only synchronized to within a few milliseconds, the counters may start counting at slightly different instances (within a few milliseconds). The count in each counter is accumulated until the receiver generates the marker pulse, indicating the reception of the particular sequence of the pseudonoise code. The difference in the count in the counter in the primary station and in the counter of any other station is directly related to the range difference between the spacecraft and the two stations, known or calculatable system errors and the synchronization error between the clocks of the two stations. Knowing the range difference and the known system errors, the error in clock synchronization is easily resolvable. Assuming that the cycles counted are of a frequency of at least 1 megacycle, the error of synchronization can be resolved to within a few microseconds.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
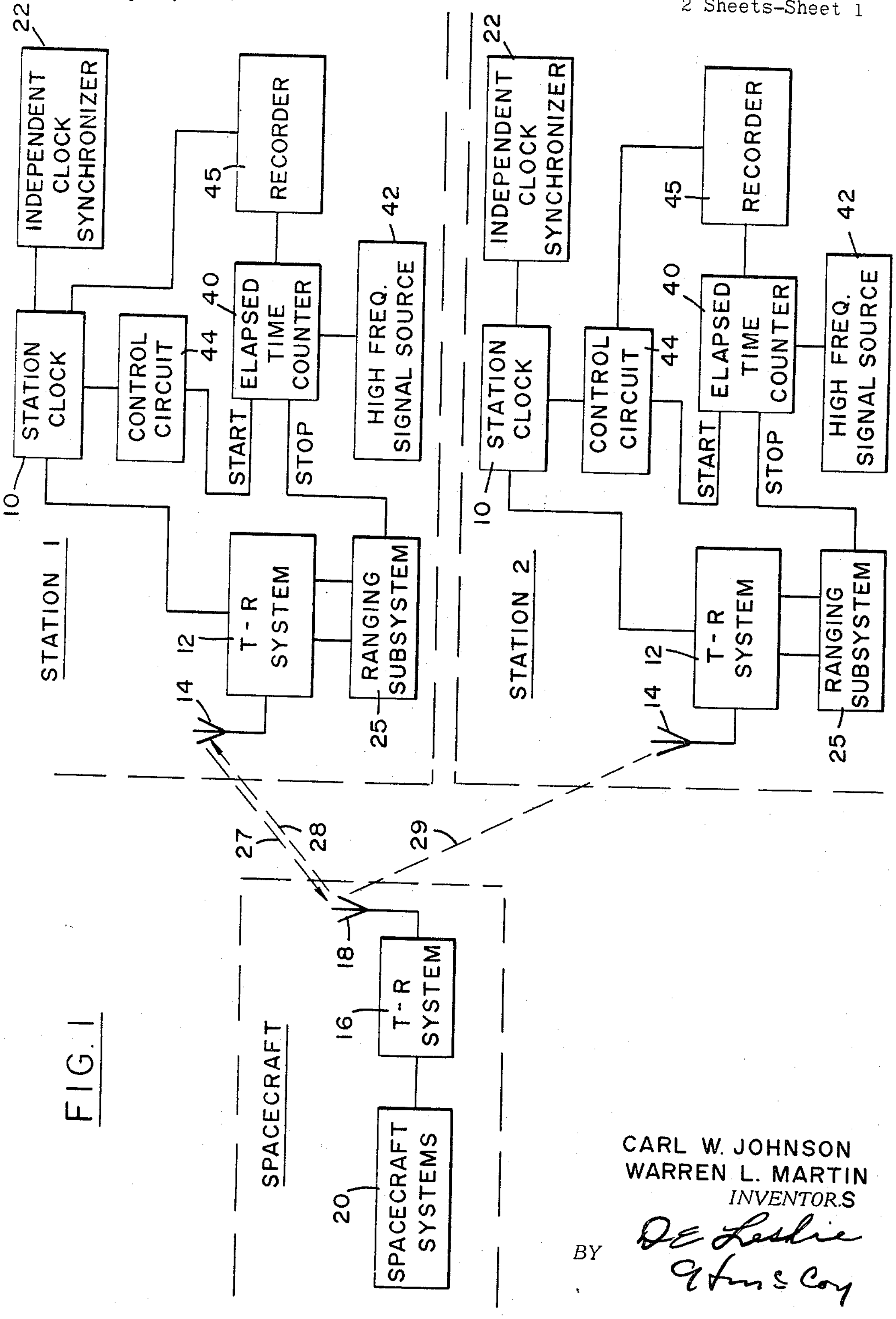
FIGURE 1 is a block diagram of equipment in two stations and a spacecraft required for practicing the present invention.

Reference is now made to FIGURE 1 which is a simplified block diagram of stations 1 and 2 at known fixed locations on earth whose general function is to track and communicate with a spacecraft. For the purpose of the present invention, it is assumed that both stations 1 and 2 simultaneously view the single spacecraft. It is also assumed that the range of one of the stations such as station 1 from the spacecraft is measured to an accuracy of 15 meters, and that likewise the range from station 2 to the spacecraft can be accurately predicted on the basis of the distance or range of station 1 from the spacecraft.

Each station is assumed to contain a master clock 10 which supplies very accurate timing signals. These signals are used to control the various instruments of the station, including the station's transmitter receiver (T–R) system 12 which transmits signals to and receives signals from the spacecraft by means of its respective antenna 14. Although only two stations are diagrammed, it should be appreciated that the teachings of the invention are applicable to any number of stations, as long as all are in view of the same spacecraft.

The spacecraft, like each station includes a T–R system 16 connected to an antenna 18, which receives signals from one of the stations while transmitting signals which may be received by all the tracking stations. The output of system 16 is shown, for exemplary purposes, to be connected to the spacecraft system, generally designated by block 20.

As is appreciated by those familiar with the art, the signals received by the various stations are generally correlated or processed in order to control the spacecraft and its course. The accuracy of correlation is dependent on the accurate determination of the time of arrival of various signals at the various stations, which is in turn dependent on the accurate synchronization of the various station clocks 10.

Herebefore, these clocks have been synchronized independently to a related source, such as WWV. For explanatory purposes only such an independent source, is represented in FIGURE 1 by independent clock synchronizer 22. With such means, the clocks can be synchronized only to within several milliseconds. It is the basic function of the present invention to increase the measurement accuracy of clock synchronization techniques. Alternately stated, the basic object of the invention is to provide a method and means to determine the error in the synchronization of clocks, which are independently synchronized to within a few milliseconds.

The invention will be described in conjunction with a multistation tracking system in which each station is assumed to include a closed loop ranging subsystem, designated by block 25. Each station is capable of transmitting a pseudonoise code to the spacecraft from which the code is returned to earth and received by all the stations. The ranging subsystem 25 in each station includes means which provide a marker pulse, whenever a predetermined sequence of bits within the code are received. However, only in the station which transmitted the code is the marker pulse used to determine the range between the spacecraft and the code transmitting station, on the basis of the two-way communication therebetween. In FIGURE 1, it is assumed that station 1 is the code transmitting station. The two way communication between station 1 and the spacecraft is represented by lines 27 and 28, while the code from the spacecraft, received by station 2 is represented by line 29.

Briefly, in accordance with this invention, a start pulse is provided in each station with a time accuracy of the independent synchronization of the station clocks, herebefore assumed to be a few milliseconds. In each station, the start pulse is used to start an accurately measured time period or interval which terminates upon the reception of the marker pulse. Knowing the range of each station to the spacecraft and known system errors, the exact difference of arrival of the marker pulse in the two stations is computable. Thus, if the two start pulses in the two stations were perfectly synchronized, the time periods measured therein should correspond to the difference in range between the two stations and the spacecraft, and the system's calibration errors. To the extent that this is not the case, it represents the error in the synchronization of the two station clocks 10 providing the start pulses, by the independent means.

Figure 2:
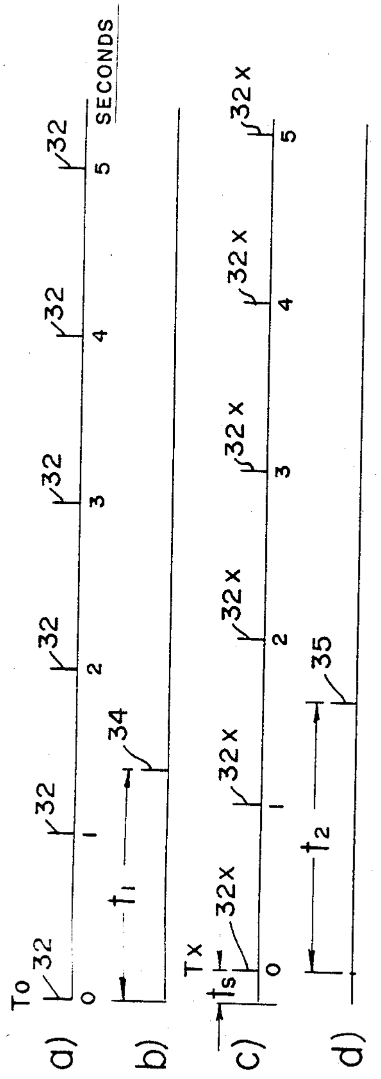
FIGURE 2 is a multiline timing diagram useful in explaining the invention.

For a better understanding of this aspect of the invention, reference is now made to FIGURE 2 which is a simplified diagram of the various pulses herebefore referred to. Let vertical lines 32 in line *a* of FIGURE 2 represent pulses produced at one second intervals by clock 10 of station 1, while lines 32*x* in line *c* of FIGURE 2 represent similar one second pulses, produced by clock 10 of station 2. Let it further be assumed that at time $T_0$, station 1 produces a timing pulse at the beginning of a given minute of common view of the spacecraft and, that station 2 produces a similar start pulse. Due however, to the imperfect synchronization between the clocks 10 of the two stations, the pulse (32*x*) in station 2 is produced at time $T_x$, where $T_x-T_0=t_s$, $t_s$ representing the synchronization error, when the clocks are synchronized by independent means. This error has been reduced by prior art techniques to several milliseconds.

In accordance with this invention, these specific start pulses synchronized to within a few milliseconds, are used to define beginnings of time intervals which end in each station when the particular sequence in the pseudonoise code is received and a marker pulse is generated. In FIGURE 2, lines 34 and 35 represent the times of arrival of the marker pulses in stations 1 and 2 respectively. Thus in station 1, the measured time interval is $t_1$ while in station 2, it is $t_2$.

The time difference may be expressed as $$t_2-t_1=t_s+t_r+t_e$$

where $t_s$ is the desired clock synchronization error. The time $t_r$ is a computable time corresponding to the range difference between the stations and the spacecraft, while $t_e$ is a time representing known or computable system errors. Knowing $t_2$, $t_1$, $t_r$ and $t_e$, $t_s$ is easily determined. Thus, the error due to the independent synchronization of the clocks is resolved.

In one embodiment, $t_2$ and $t_1$ were determined by counting cycles or signals from a precise high frequency source. Referring again to FIGURE 1, there is shown an elapsed-time counter 40 and a signal source 42, included in each station. Source 42 is assumed to be a source of high frequency signals, such as 10 megacycles. Each station also includes a control circuit 44 which is assumed to use signals from clock 10 to enable the counter 40, at a given point in time with a start signal to count the signals from source 42. Such start signals may be produced at the beginning of each minute of common viewing. All counters are enabled within a few milliseconds.

Once enabled, each counter 40 counts the high frequency signals from its respective source 42. The counting is terminated by a stop signal supplied by the ranging subsystem 25, when the particular bit sequence in the pseudonoise code is received from the spacecraft and the marker pulse is produced. The count accumulated in each counter 40 may be recorded by a recorder 45, together with the time supplied by clock 10 when the recording took place. The counts accumulated in the different stations represent $t_1$ and $t_2$ at stations 1 and 2 respectively. Knowing $t_r$ and $t_e$, $t_s$ is determined. Once the error in the synchronization of the two clocks is known, the arrival of all data at the two stations is corrected, thereby enhancing the results of all correlated data.

As previously indicated, the method of the invention is based on the knowledge of the range of each station to the spacecraft, so that $t_r$ can be determined. Also, an actual or accurately predictable value of all system errors $t_e$ must be available. With presently known equipment and techniques, it is believed that the range of station 2 can be predicted to at least within 150 meters, if the range of station 1 is measurable to within 15 meters. Thus, the uncertainty in determining range can be assumed to be below 0.5 microsecond ($\mu$s.).

In FIGURE 2, the distance between station 2 and the spacecraft is assumed to be greater than the distance to station 1, since the stop signal, or marker pulse in station 2, represented by line 35, occurs after the occurrence of a corresponding pulse in station 1, which is represented by line 34. Neglecting for explanatory purposes the term $t_e$, which represents known or computable system error, in FIGURE 2, the distance between lines 35 and 34, represents $t_r$, which is the difference in signal travel time to stations 1 and 2 from the spacecraft, or the range difference between the two stations and the spacecraft. Since in each stage, the ranging sub-system 25 provides the range to the spacecraft, the range difference, corresponding to $t_r$ is available.

Briefly, after the counting operation the term $t_r$ corresponding to the range difference between the stations to the spacecraft at the end of the counting operation is derived. Then, a count corresponding $t_r$ is subtracted from the count in the station, farther away from the spacecraft, which, in the example diagrammed in FIGURE 2, is station 2. The counts in the counters of the two stations are then compared. If the synchronization error between the two independently synchronized clocks is zero, the counts would be the same. Any count difference represents the synchronization error $t_s$. In the example diagrammed in FIGURE 2, the count in station 2, after subtracting $t_r$, would be smaller than the count in station 1, since the counting in station 2 starts late by a time $t_x$ with respect to the counting start time in station 1. Thus, knowing the difference between the counts in the two counters and the frequencies from sources 42, the synchronization error is easily obtained.

Figure 3:
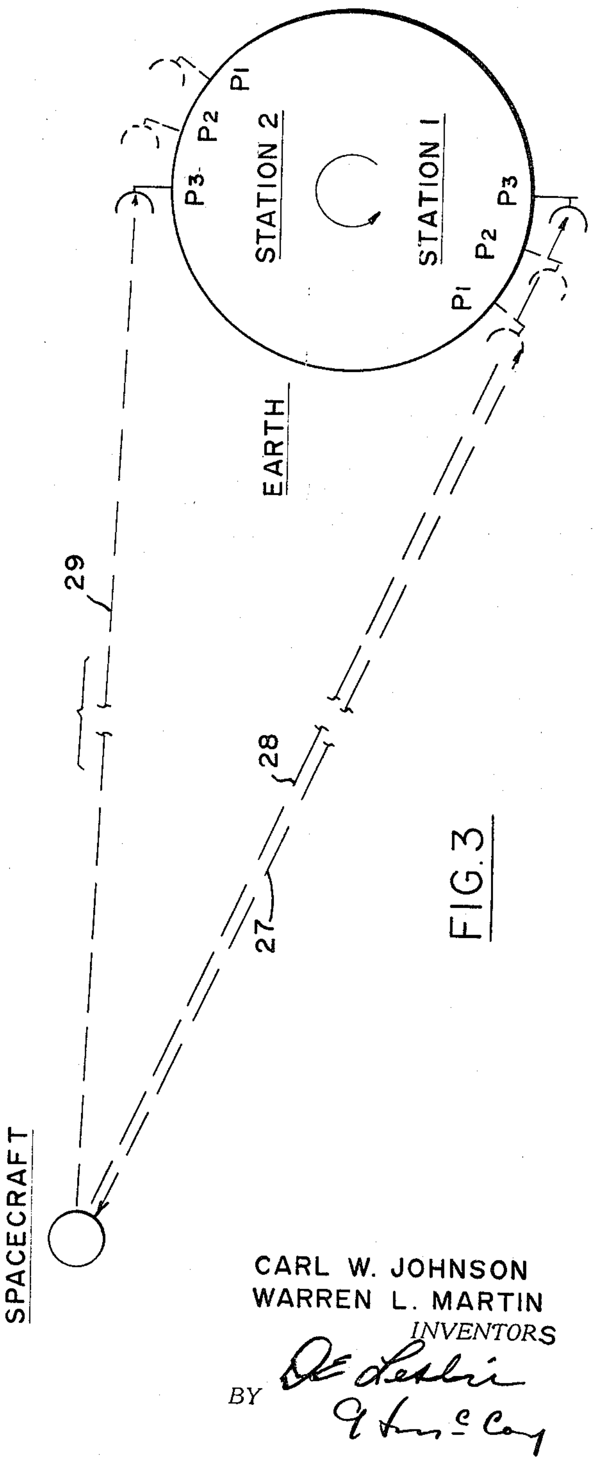
FIGURE 3 is a dagram useful in explaining a possible source of error which has to be accounted for in practicing the present invention.

A possible source of error which is assumed to be included in the term $t_e$ is introduced by the earth's rotation. A slight range change occurs during the signals down-link flight time. If the distances are specified at the instant when the signal leaves the satellite, the predicted arrival times may be in error. The worst case of error occurs for two stations on the Equator as shown in FIGURE 3, to which reference is made herein. Therein P1 represent the positions of the stations 1 and 2, when the coded signal is transmitted from station 1 to the spacechaft, assumed to be at lunar distance and P2 and P3 the station positions when the code is retransmitted by the spacecraft and received by the stations, respectively. A total discrepancy of 1100 meters might be possible which corresponds to 3.5 microseconds. However, in practice, the change in range during the signal transit time are accounted for as part of the range computation, so that this source of error becomes very small compared to 1 microsecond.

Other possible sources of uncertainty or error relate to equipment calibration and time interval measurement. These are represented by the term $t_e$. In equipment calibration, existing calibration procedures call for calibration of the entire system as a single unit including the transmitter, transponder, receiver and ranging subsystem. However, by separately calibrating the receiver and ranging subsystem, which are the only possible instruments which may contribute to an error in the computation in accordance with this invention, it is believed that even in the worst case, the maximum uncertainty due to equipment calibration is not more than 2 microseconds ($\mu$s.).

As to time interval measurement, by using a highly precise source of signals 42, the error can be reduced to a minimum. Pulse rise times may be held not to exceed 0.1 $\mu$s., and the quantization interval held to 0.1 $\mu$s. Thus, the worst total error in measuring the time interval in each station can be held to less than 0.5 $\mu$s. Since two stations make this measurement simultaneously, a total cumulative error not exceeding 1.0 $\mu$s. is reasonable.

The various sources of error are listed in the following table, together with the worst case error and the expected error that each source may produce in $\mu$s.

TABLE I

| Source | Worst Case Error, microsecond | Expected Error, microsecond |
|---|---|---|
| 1. Range Prediction | 0.5 | 0.2 |
| 2. Earth Rotation (2 stations) | 3.5 | 0.1 |
| 3. Equipment Calibration | 2.0 | 1.0 |
| 4. Interval Measurement (2 stations) | 1.0 | 0.5 |
| Total Error | 7.0 | 1.8 |

From the table, it is clearly seen that the total expected error in the worst case is only 7.0 $\mu$s., which is an increase in synchronization resolution of over 1000 times compared with present techniques. The actual expected error is only about 2.0 $\mu$s., as compared with several milliseconds achievable with present techniques. Experimental data obtained by measuring clock synchronization errors between three stations has indicated a closure error of 1 microsecond. Thus, the present invention greatly contributes to accurately resolving the synchronization error when station clocks are independently synchronized with respect to an independent source.

There has accordingly been shown and described herein a novel method of resolving the synchronization error of independently synchronized clocks and means for practicing the method. It is appreciated that those familiar with the art may make modifications in the arrangements disclosed without departing from the teachings of the invention. For example, the stop signal in each station need not be produced from the pseudonoise code used for ranging, but may be produced or supplied in response to a unique code transmitted from the spacecraft to all stations. Therefore, all such modifications and/or equivalents are deemed to fall within the scope of the invention as claimed in the appended claims.

What is claimed is:

1. A method of increasing the resolution of synchronization of signal sources in separate stations, operating to track a body, the steps comprising:

independently synchronizing the sources of signals to within a first minimal time period;

initiating the beginnings of time interval measurements in the stations with specific start signals from said sources;

providing a coded signal in said body;

transmitting said coded signal from said body to said stations;

in each station, receiving the coded signal from said body; and terminating the time interval measurement in each station upon the reception of said coded signal.

2. The method as recited in claim 1 wherein said first minimal time period is within a range of several milliseconds, and the time interval in each station being measurable to within 1 microsecond.

3. The method as recited in claim 1 further including the step of transmitting from one station said coded signal to said body wherein said coded signal is retransmitted to said one station locked thereto to determine in said one station the distance therebetween and said body.

4. The method as recited in claim 1 wherein in each station signals in the radio frequency range are counted between said start signal and the reception of said coded signal to accurately determine the length of the time interval measured therein, as a function of the count of said radio frequency signals.

5. The method as recited in claim 4 wherein the counted signals are of a frequency of at least 1 megacycle, and said minimal time period is within the range of several milliseconds.

6. The method of resolving the error in the synchronization of master clocks of stations operated to track a body in space, the clocks being independently synchronizable with respect to a reference source to within a first minimal time period, the method comprising the steps of:

independently synchronizing the master clocks of the stations with respect to a reference source, whereby the clocks are synchronized to within a first minimal time period;

controlling the clock in each station to provide a control signal at a selected time, whereby all of said clocks provide said control signals within said first minimal time period, representing a gross error in the independent synchronization of said clocks;

providing in each station a source of high frequency signals;

in each station utilizing the control signal to initiate a count of said high frequency signals;

providing a coded signal in said body in space;

transmitting said coded signal from said body in space to said stations;

in each station receiving said coded signal from the body in space; and in each station utilizing said coded signal to terminate the count therein.

7. The method as recited in claim 6 wherein the coded signal transmitted by said body in space is a coded signal received thereby from one of said stations, said one station utilizing the coded signal returned thereto from said body for determining its distance therefrom.

8. The method as recited in claim 6 wherein said first minimal time period is in the range of several milliseconds and the frequency of the signals counted in each station is in the radio frequency range.

9. The method as recited in claim 8 wherein the coded signal transmitted by said body in space is a coded signal received thereby from one of said stations, said one station utilizing the coded signal returned thereto from said body for determining its distance therefrom.

10. The method as recited in claim 9 wherein the frequency of the signals counted in each station is at least 1 megacycle.

11. In a multistation body-tracking system of the type in which each station includes a master clock for providing timing control signals, the clocks being independently synchronizable with respect to a reference source so that timing signals provided by said clocks are synchronized to not better than a minimal time period, an arrangement for resolving the synchronization error of said master clocks comprising:

first means in each station responsive to a specific timing signal from a master clock in the station to provide a time-measuring start signal;

second means in each station for receiving signals from a body and for determining the distance between the station and said body;

third means in each station for providing a stop signal when said second means receive a preselected signal from said body; and fourth means in each station for providing a measure of the time period between said start and stop signals whereby the difference in the time periods, measured in any two stations is a function of the known difference of the distances of said two stations to said body and the synchronization error of said master clocks.

12. The arrangement as recited in claim 11 wherein said fourth means includes a source of high frequency signals and a counter for counting said high frequency signals between said start and stop signals applied thereto.

13. The arrangement as recited in claim 12 wherein said source provides signals at a frequency of at least 1 megacycle.

14. The arrangement as recited in claim 13 wherein said third means comprise a ranging system responsive to a multibit ranging code received from said body for providing said stop signal when a predetermined sequence of bits in said code is received.

15. The arrangement as recited in claim 11 wherein said first means provide said start signal at the beginning of each minute of a period in which said stations are in direct view of said body.

16. The arrangement as recited in claim 15 wherein said body is a spacecraft and the signals from said source are of a frequency of about 10 megacycles.

References Cited

UNITED STATES PATENTS

| | | | |
|---|---|---|---|
| 3,117,317 | 1/1964 | Kenyon | 343—12 X |
| 3,157,874 | 11/1964 | Altar et al. | 343—12 X |
| 3,222,672 | 12/1965 | Forestier | 343—7.5 |
| 3,250,896 | 5/1966 | Perkinson et al. | 343—7.5 X |

RODNEY D. BENNETT, *Primary Examiner.*

M. F. HUBLER, *Assistant Examiner.*